(12) United States Patent
Galloway et al.

(10) Patent No.: US 9,257,698 B2
(45) Date of Patent: Feb. 9, 2016

(54) COMPOSITION, ENERGY STORAGE DEVICE, AND RELATED PROCESS

(71) Applicant: GENERAL ELECTRIC COMPANY, Schenectady, NY (US)

(72) Inventors: Robert Christie Galloway, Needlewood (GB); Job Thomas Rijssenbeek, Niskayuna, NY (US); Guillermo Daniel Zappi, Niskayuna, NY (US); James Sudworth, Burton on Trent (GB)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 13/675,061

(22) Filed: Nov. 13, 2012

(65) Prior Publication Data

US 2014/0132221 A1     May 15, 2014

Related U.S. Application Data

(63) Continuation-in-part of application No. 12/519,784, filed as application No. PCT/GB2008/000239 on Jan. 23, 2008, now Pat. No. 9,065,133.

(30) Foreign Application Priority Data

Jan. 25, 2007   (GB) .................................. 0701370.9

(51) Int. Cl.
*H02J 7/00*          (2006.01)
*H01M 4/134*       (2010.01)
(Continued)

(52) U.S. Cl.
CPC ................. *H01M 4/134* (2013.01); *H01M 4/02* (2013.01); *H01M 4/38* (2013.01); *H01M 4/582* (2013.01); *H01M 4/5815* (2013.01);
(Continued)

(58) Field of Classification Search
CPC ...... Y02E 60/12; H01M 10/44; H02J 7/0093; H02J 7/0075; Y02T 10/7005
USPC ......................................................... 320/130
See application file for complete search history.

(56) References Cited

U.S. PATENT DOCUMENTS

| 4,797,333 A | 1/1989 | Coetzer et al. |
| 5,536,594 A | 7/1996 | Galloway et al. |

(Continued)

OTHER PUBLICATIONS

European search report issued in connection with EP Patent Application No. 13192515.8 dated Jun. 26, 2014.

(Continued)

*Primary Examiner* — Arun Williams
(74) *Attorney, Agent, or Firm* — Dority & Manning, P.A.

(57) ABSTRACT

A positive electrode composition is provided. The positive electrode composition includes at least one electroactive metal selected from the group consisting of titanium, vanadium, niobium, molybdenum, nickel, iron, cobalt, chromium, manganese, silver, antimony, cadmium, tin, lead, copper, zinc, and combination thereof, an alkali metal halide, and aluminum, present in an amount of at least 0.5 weight percent, based on the weight of the positive electrode composition. Optionally, an amount of sodium iodide of up to about 1.0 weight percent, based on the weight of the sodium halide in the positive electrode composition, is included. The composition may be included in a positive electrode with a molten electrolyte salt comprising the reaction product of an alkali metal halide and an aluminum halide. An energy storage device including the composition is provided, as well as a method of operating the device.

17 Claims, 9 Drawing Sheets

(51) Int. Cl.
*H01M 10/0563* (2010.01)
*H01M 4/02* (2006.01)
*H01M 4/38* (2006.01)
*H01M 4/58* (2010.01)
*H01M 10/39* (2006.01)
*H01M 10/44* (2006.01)
*H01M 2/16* (2006.01)
*H01M 2/18* (2006.01)

(52) U.S. Cl.
CPC ....... *H01M 10/0563* (2013.01); *H01M 10/399* (2013.01); *H01M 10/446* (2013.01); *H02J 7/00* (2013.01); *H01M 2/16* (2013.01); *H01M 2/18* (2013.01); *H01M 2300/0048* (2013.01)

(56) References Cited

U.S. PATENT DOCUMENTS

| | | | |
|---|---|---|---|
| 2002/0015869 A1* | 2/2002 | Suda | 429/19 |
| 2002/0071990 A1* | 6/2002 | Kweon et al. | 429/231.1 |
| 2002/0177042 A1* | 11/2002 | Amendola | 429/218.1 |
| 2003/0157407 A1* | 8/2003 | Kosuzu et al. | 429/231.95 |
| 2005/0058903 A1* | 3/2005 | Eylem et al. | 429/220 |
| 2010/0068610 A1 | 3/2010 | Sudworth | |
| 2011/0070496 A1 | 3/2011 | Soloveichik et al. | |
| 2011/0104563 A1 | 5/2011 | Galloway et al. | |
| 2014/0030596 A1* | 1/2014 | Wu et al. | 429/223 |

OTHER PUBLICATIONS

U.S. Appl. No. 12/519,784, filed Jun. 18, 2009, James Sudworth.

* cited by examiner

COMPOSITION, ENERGY STORAGE DEVICE, AND RELATED PROCESS

CROSS-REFERENCE TO RELATED APPLICATIONS

This application is a continuation-in-part of U.S. application Ser. No. 12/519,784, filed 18 Jun. 2009, which was the National Stage of International Application No. PCT/GB2008/000239, filed 23 Jan. 2008, which claimed the benefit of GB Application No. GB0701370.9, filed 25 Jan. 2007.

BACKGROUND

The invention includes embodiments that relate to an electrode composition and method of its making and operation. The invention further includes embodiments that relate to an electrode for an energy storage device.

Metal chloride batteries, especially sodium-nickel chloride batteries with a molten sodium anode and a beta-alumina solid electrolyte, are widely employed for energy storage applications. When the metal chloride batteries are employed in mobile applications, like hybrid locomotives or plug-in electric vehicles (PHEV), or hybrid telecom devices, it is desirable for the batteries to be capable of providing and accepting power during discharging and charging of the battery, respectively. Historically, it has been a focus of battery technology to provide cell compositions that maintain the highest possible operating capacity. In some cell compositions, aluminum has been added, along with other additives, to improve cell performance. However, the amount of aluminum utilized has been minimized, for example to amounts below about 1 weight percent of the positive electrode composition, because amounts in excess of this generally impede operating capacity.

It has now been found that for certain applications, for example hybrid electric vehicles, hybrid telecom devices, and other uninterruptible power systems (UPS) applications, it may be desirable to provide a battery composition that delivers enhanced charge acceptance and cycle life, in conjunction with enhanced discharge power. Modifying the positive electrode composition of a battery may significantly improve the charge acceptance and cycle life, as wells as discharge power, of a battery, even if this is achieved at a reduced cell capacity.

Known battery composition modification mechanisms that have been tried include additives to increase the robustness of the nickel network, additives to promote greater nickel surface area, additives to increase salt availability or surface area, additives to increase use of greater amounts of iron, and the use of added sulfur, in the form of metal sulfides, to increase capacity retention, presumably by poisoning the nickel surface to mitigate against nickel particle growth. Most of these modifications have as their target improved cell capacity.

BRIEF DESCRIPTION

In accordance with one aspect of the present invention, a positive electrode composition is provided. The positive electrode composition includes at least one electroactive metal selected from the group consisting of: titanium, vanadium, niobium, molybdenum, nickel, cobalt, iron, chromium, manganese, silver, antimony, cadmium, tin, lead, copper, and zinc; at least one alkali metal halide; and aluminum, present in an amount of at least 0.5 weight percent, based on the weight of the positive electrode composition. Optionally included is an amount of sodium iodide, for example up to about 1.0 weight percent, based on the weight of the sodium halide in the positive electrode composition. In another embodiment of the present invention, a positive electrode composition includes aluminum present in an amount of at least 1.0 weight percent, based on the weight of the positive electrode composition.

In yet another embodiment of the present invention there is provided an energy storage device including: a housing; a current collector; a positive electrode composition disposed within the housing, and a molten electrolyte salt disposed within the housing. The positive electrode composition includes: at least one electroactive metal selected from the group consisting of titanium, vanadium, niobium, molybdenum, nickel, cobalt, iron, chromium, manganese, silver, antimony, cadmium, tin, lead, copper, and zinc, at least one alkali metal halide, and aluminum, present in an amount of at least 0.5 weight percent, based on the weight of the positive electrode composition, and optionally one or more additives, which may include an amount of sodium iodide of up to about 1.0 weight percent, based on the weight of the sodium halide in the positive electrode composition. The molten electrolyte salt includes the reaction product of at least one alkali metal halide and an aluminum halide. In yet another embodiment of the device, at least 10 percent of the sodium generated by the first charge remains in the negative electrode after full discharge of the electroactive metal(s). In some embodiments, the device has application for hybrid electric vehicles, hybrid telecom devices, and other UPS applications.

In accordance with yet another aspect of the present invention, a method of operating an energy storage device is provided. The method involves providing an energy storage device having a positive electrode including a positive electrode composition and a molten electrolyte salt in accord with the foregoing, and applying at least 1 charge/discharge cycle to the device such that during the first charge the electroactive metal oxidizes to electroactive metal chloride by reacting with up to about 90 percent of the total amount of chloride available for reaction. In other embodiments, the molten electrolyte salt includes the reaction product of at least one alkali metal halide and an aluminum halide, wherein substantially all of the sodium chloride is used in the oxidation of electroactive metal to electroactive metal chloride during the maiden charge of the device, and at least 10 percent of the sodium chloride capacity of the cell is not utilized during normal cycling of the device. In some embodiments, the method further involves applying at least 1 charge/discharge cycle to the device such that at least 10 percent of the sodium generated during the first charge cycle remains in the negative electrode after normal full discharge. In still other embodiments, at least 95 percent of the alkali metal halide reacts with the electroactive metal and/or aluminum during the first charge of the device.

BRIEF DESCRIPTION OF THE FIGURES

These and other features, aspects, and advantages of the present invention will become better understood when the following detailed description is read with reference to the accompanying drawings in which like characters represent like parts throughout the drawings, wherein.

DETAILED DESCRIPTION

The invention relates generally to a positive electrode composition. More particularly, the invention relates to a positive electrode composition for an energy storage device. The invention further includes embodiments that relate to a method of using the energy storage device.

Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As used herein, the terms "may" and "may be" indicate a possibility of an occurrence within a set of circumstances; a possession of a specified property, characteristic or function. These terms may also qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be".

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

"Optional" or "optionally" means that the subsequently described event or circumstance may or may not occur, and that the description includes instances where the event occurs and instances where it does not.

Furthermore, whenever a particular feature of the invention is said to comprise or consist of at least one of a number of elements of a group and combinations thereof, it is understood that the feature may comprise or consist of any of the elements of the group, either individually or in combination with any of the other elements of that group.

When introducing elements of various embodiments of the present invention, the articles "a," "an," "the," and "said" are intended to mean that there are one or more of the elements. The terms "comprising," "including," and "having" are intended to be inclusive, and mean that there may be additional elements other than the listed elements. Furthermore, the terms "first," "second," and the like, herein do not denote any order, quantity, or importance, but rather are used to distinguish one element from another.

It is understood that while, with regard to some embodiments, an exemplary positive electrode composition includes nickel as an electroactive metal, any electroactive metal or metals suggested herein may be used, and such exemplary compositions are defined merely for the purpose of more clearly describing the invention to the reader. Likewise with any other component of the composition which may by definition in accord herewith be one or more different materials or combinations thereof. It is further understood that as set forth herein, the terms "sodium electrode", "anode", and "negative electrode" may be used interchangeably, and likewise the terms "cathode", and "positive electrode" may be used interchangeably.

Embodiments of the invention described herein address the noted shortcomings of the state of the art. For example, most applications that are based on rechargeable batteries prefer to minimize recharge time since this is not a "useful" state. Further, it has now been determined, however, that for some applications it is desirable to provide an energy storage device that provides high power or longer operating times at the same power, better charge acceptance, i.e., charges faster, and longer cycle life. The foregoing benefits are shown to be provided by an energy storage device including a positive electrode composition in accord with that disclosed herein. For example, such a positive electrode composition includes a conventional metal/metal chloride cell chemistry in conjunction with an amount of aluminum in accord herewith, i.e., an amount of aluminum in excess of about 0.5 weight percent based on the weight of the positive electrode composition, optionally in conjunction with sodium iodide in an amount up to about 1.0 weight percent, based on the weight of the sodium halide in the positive electrode composition. Further, the amount of aluminum included may be in excess of about 1.1 weight percent. The amount of aluminum used herein effectively exhibits greater charge acceptance and higher discharge power capability, as well as enhanced cycle life.

Therefore, there are provided herein embodiments that advantageously provide a positive electrode including an improved positive electrode composition for use in a metal-metal chloride battery, for example, a sodium-nickel chloride battery. The positive electrode composition is intended for use in conjunction with a molten electrolyte salt composition, and includes an electroactive metal, an alkali metal halide, aluminum, and optional additives as noted further below, in some embodiments including sodium iodide. As such, the term "positive electrode composition" as used herein does not include the molten electrolyte salt composition, and weight percentages with regard to the positive electrode composition are based on the weight of the positive electrode composition, not including the molten electrolyte salt, unless otherwise stated. Though the "molten electrolyte salt" is molten only during operation, the term is used here to differentiate clearly the electrolyte salt composition, which becomes molten in the operational state, from the positive electrode composition set forth herein.

The positive electrode composition comprises at least one electroactive metal, selected from the group consisting of titanium, vanadium, niobium, molybdenum, nickel, iron, cobalt, chromium, manganese, silver, antimony, cadmium, tin, lead, copper, and zinc, and at least one alkali metal halide, in accord with known battery chemistry. The electroactive metal, in an embodiment of the present invention, is present in an amount in a range from about 50 weight percent to about 75 weight percent, for example about 50 weight percent to about 65 weight percent, based on the weight of the positive electrode composition. Also included is an alkali metal halide, for example one or more alkali metal halides, in an amount of from about 25-50 weight percent, for example about 35 weight percent to about 45 weight percent, based on the weight of the positive electrode composition. Still further, the positive electrode composition includes aluminum, present in an amount of at least 0.5 weight percent, for example at least about 1.0 weight percent based on the weight of the positive electrode composition. In some embodiments, sodium iodide in an amount of less than about 1.0 weight percent, based on the weight of the alkali metal halide in the positive electrode composition, is included.

In one embodiment, less than about 90 percent of the total amount of the alkali metal halide is used to oxidize the electroactive metal to electroactive metal halide during the maiden charge.

In accordance with another embodiment of the device, at least 95 percent of the alkali metal halide(s) react with the electroactive metal(s) and/or aluminum during the first (maiden) charge of the device.

In still another embodiment of the device, at least 10 percent of the original sodium chloride capacity of the cell is not utilized during normal cycling of the device. Normal cycling is the utilization of only the capacity realized on the electroactive metal.

In yet another embodiment of the device, at least 10 percent of the available sodium generated during the first charge remains in the negative electrode after a normal full discharge.

The invention, therefore, in accord with some embodiments relates to decreasing the recharge time of alkali metal halide cells by including an amount of aluminum as noted hereinabove and described more fully below. In some embodiments the invention relates to improving cycle life of alkali metal halide cells by including an amount of aluminum as noted hereinabove and described more fully below. In some embodiments the invention relates to improving the capability of alkali metal halide cells including an amount of aluminum, as noted hereinabove and described more fully below, to operate for an extended period of time to a specific power.

Without intending to be bound by any one theory, the following are possible reasons for the enhanced and advantageous performance data presented with regard to use of the positive electrode composition in accord herewith. Because aluminum oxidizes at a potential below that of nickel, it consumes capacity that might otherwise be realized on nickel. Aluminum consumes four equivalents of NaCl during oxidation to form $NaAlCl_4$, e.g. for every 4 moles of sodium chloride reacted with 1 mole of aluminum, 1 mole of molten electrolyte salt is generated, along with 3 moles of sodium. The sodium generated is stored in the anode, where it remains unused during normal cell cycling. Therefore, for a given amount of NaCl in a positive electrode composition, the amount of Ni converted to $NiCl_2$ is reduced as more Al is included in the composition. This significantly reduces the utilization of the nickel which may enable a more robust nickel electrical network and may mitigate surface area loss. Advantageously, the $NaAlCl_4$ that is generated by aluminum oxidation is the electrolyte in an energy storage device in accord herewith. Thus, increasing the amount of Al also increases the amount of molten electrolyte salt, which may aid ionic transport through the cathode.

Yet another potential mechanism for the benefit realized upon the inclusion of an amount of aluminum in accord herewith is that its oxidation and dissolution may yield greater porosity in the cathode, allowing increased ionic access via the molten electrolyte salt to the active mass of the cathode. This, in conjunction with the generation of additional $NaAlCl_4$, which provides enhanced ionic transport within the cathode, provides an over-all benefit.

In certain battery applications, such as hybrid vehicle and telecom devices, the battery is required to undertake a high rate discharge in a short time to a specific cut off voltage. In one embodiment, as shown below and in the figures, the inventive electrode composition provides an improved discharge curve such that the energy delivered to a fixed cut off voltage is improved.

As noted above, though it has been known to include aluminum in the positive electrode composition, the amount used was purposely kept low to minimize the amount of sodium chloride, and thus cell capacity, consumed by the aluminum. In other words, conventional aluminum use has been limited by a desire to maintain operating capacity. In contrast to this conventional use of aluminum, however, in accord herewith aluminum is used at higher levels, in excess of 0.5 weight percent, for example at least 1.0 weight percent, based on the weight of the positive electrode composition, intentionally consuming capacity in order to gain cycle life, charge acceptance and discharge power. With the use of higher levels of aluminum, less than about 90 percent of the total amount of the alkali metal halide, for example sodium chloride, is used to oxidize the electroactive metal to electroactive metal halide during the maiden charge. A further benefit is that at least 8 percent of the total molten electrolyte salt is generated from oxidation of aluminum in the presence of alkali metal halide, for example sodium chloride, during the first charge of the device. Also advantageous is the inclusion of one or more metal halide additives, for example sodium iodide, as part of the positive electrode composition. Under normal operation of an electrochemical cell, the electrolyte is not reduced, and therefore at least 10 percent of the available sodium created during first charge of the aluminum remains in the negative electrode (anode) after discharge. This additional sodium may provide protection against over-discharge. These benefits will be shown more clearly below with regard to the figures and examples provided.

Sodium metal chloride cells are conveniently assembled in the discharged state from a blend of the chosen electroactive metal(s), typically nickel and/or iron, and alkali metal halide(s), typically sodium chloride, though as noted any material disclosed herein for such purpose may be suitably employed. The inclusion of at least about 0.5 weight percent aluminum, e.g. at least about 1.0 weight percent aluminum, which reacts with sodium chloride on the first charge, generates additional sodium tetrachloroaluminate, in addition to the molten electrolyte salt added during cell construction, and further provides sodium that remains in the anode.

Without intending to be bound by any particular theory, it is believed that the particular features set forth above for the positive electrode composition can enhance the performance of an energy storage device in which the positive electrode is incorporated, e.g. a device based on high-temperature metal-halide/sodium cells, by increasing the maximum discharge power density of the cells. This may also increase the period of time over which the cells can sustain high-power discharging. Further, it also improves charge acceptance and therefore lowers recharge time, maintaining charge acceptance better over time under relevant duty cycles.

As used herein, a cathodic material is a material that supplies electrons during the charging process of a battery, and is present as part of a redox reaction. In contrast, an anodic material, also present as part of the redox reaction, accepts electrons during the charging process of a battery. The positive electrode includes cathodic materials having differing functions: an electrode material, a support structure, and a current collector. The electrode materials are present in the positive electrode as participating electrochemical reactants, in their oxidized and reduced states, or at some state between full oxidation and full reduction. In an exemplary embodiment, the electroactive metal oxidizes in the presence of sodium chloride and molten sodium tetrachloroaluminate to the metal chloride, having an oxidation potential vs. sodium above 1.8V. In a further embodiment, the electroactive metal comprises iron and nickel having oxidation potentials vs. sodium of 2.35V and 2.58 V, respectively.

Two electrolytes are included in the energy storage device having the positive electrode composition in accord with an embodiment hereof. One electrolyte is a solid support structure, for example beta"-alumina, which usually does not undergo any significant change during any chemical reaction in the device, but provides an ion transport pathway, and supports the electrode material as it undergoes chemical reaction. Additives that facilitate the ion transport mechanism, but do not themselves provide the mechanism, are distinguished from the electrolyte itself. The other electrolyte is a salt that is molten at the device operating temperature, for example $NaAlCl_4$, which allows for the transport of ions, for example sodium ions, within the volume of the cathode, but does not transport ions between the cathode and the anode. The positive electrode includes a positive electrode composition in accord herewith and a molten electrolyte salt. As stated earlier, the term "molten", as used in this specification, does not necessarily mean that the molten electrolyte salt is molten at the temperature at which the positive electrode composition or positive electrode is assembled; rather, it is intended to refer to a "molten" state at the device operating temperature.

The electroactive metal of the positive electrode composition may be at least one transition metal selected from the group consisting of titanium, vanadium, niobium, molybdenum, nickel, iron, cobalt, chromium, manganese, molybdenum, and silver. In other embodiments, the electroactive metal may be at least one metal selected from antimony, cadmium, tin, lead, copper, and zinc.

In one embodiment, the electroactive metal (or several of the metals) may be employed in the form of a salt. For example, nitrates, sulfides, or halides of the electroactive metal or metals may be used. In one embodiment, one or more halide and/or sulfide salts are preferred.

In some instances, the amount of electroactive metal present in the positive electrode composition is in a range from about 50 weight percent to about 75 weight percent, for example about 50 weight percent to about 65 weight percent, based on the weight of the positive electrode composition. One skilled in the art will appreciate that the electroactive metal(s), for example, nickel, may function as the positive electrode current carrying grid. If the amount of nickel is not high enough to pass electric current, the cell may not function as expected. On the other hand, an amount of nickel that is in excess of what is needed to pass the current may occur at the expense of the desirable levels of the molten electrolyte salt and/or the alkali metal halide, both of which perform critical functions.

The positive electrode composition also includes at least one alkali metal halide. In one embodiment, the alkali metal halide is at least one alkali metal halide selected from sodium chloride, sodium iodide, sodium bromide, sodium fluoride, potassium chloride, potassium iodide, potassium bromide, potassium fluoride, lithium chloride, lithium iodide, lithium bromide, lithium fluoride, and cesium chloride. In some specific embodiments, the alkali metal halide of the positive electrode composition is one or more alkali metal halide selected from the group consisting of sodium chloride, sodium iodide, sodium fluoride, lithium chloride, and potassium chloride. In another embodiment, the positive electrode composition includes sodium iodide and another alkali metal halide. The amount of alkali metal halide included is in accord with that generally known to be included in positive electrode compositions for batteries or devices in accord herewith. In this regard, the disclosure of U.S. Ser. No. 12/977,471, filed 23 Dec. 2012, to our common assignee and providing a full description of such compositions, is incorporated herein by reference. In some embodiments, the alkali metal halide content may be included as from about 25 weight percent to about 50 weight percent of the positive electrode composition, for example, from about 35 weight percent to about 45 weight percent, based on the weight of the positive electrode composition.

The molten electrolyte salt included in the positive electrode with the positive electrode composition may comprise the reaction product of an alkali metal halide and an aluminum halide. The alkali metal halide is not the alkali metal halide referred to with regard to the positive electrode composition, though it may be the same as the alkali metal halide used therein. In one embodiment, the alkali metal halide with which an aluminum halide may be reacted to form the molten electrolyte salt, is at least one alkali metal halide selected from sodium chloride, sodium iodide, sodium bromide, sodium fluoride, potassium chloride, potassium iodide, potassium bromide, potassium fluoride, lithium chloride, lithium iodide, lithium bromide, lithium fluoride, and cesium chloride. The molten electrolyte salt should have a melting point of less than about 300 degrees Celsius. In one embodiment, the molten electrolyte salt has a melting point in a range from about 300 degrees to about 250 degrees Celsius, from about 250 degrees Celsius to about 200 degrees Celsius, or from about 200 degrees Celsius to about 150 degrees Celsius. In one embodiment, the alkali metal halide is sodium chloride and the aluminum halide is aluminum chloride. In this embodiment, the molten electrolyte salt is $NaAlCl_4$, having a melting point of about 155 degrees Celsius.

In one embodiment, the positive electrode composition includes an amount of aluminum in elemental form, e.g. aluminum metal flakes or particles, though other forms, e.g. as part of a compound, may be used. Without intending to be bound by any particular theory, it is believed that the aluminum may assist in improving the porosity of the cathode, and may further enable the formation of more cohesive granules, resulting in higher granulation yield with less fines and/or dust, such that inter-granular space is increased. As noted above, increased porosity provides for increased access to the active mass of the cathode. In some embodiments, the aluminum present in the positive electrode composition is present as at least about 0.5 weight percent, for example at least about 1.0 weight percent, of the composition, based on the weight of the positive electrode composition.

In some embodiments, the positive electrode composition may further comprise sulfur, in the form of elemental sulfur or a sulfur-containing compound. For example, sulfide compounds of electroactive metals may be included, e.g. zinc sulfide or iron sulfide, among others.

Without intending to be bound by any one theory, the positive electrode composition may include other additives that may beneficially affect the performance of an energy storage device including such composition. Such performance additives may increase ionic conductivity, increase or decrease solubility of the charged cathodic species, improve wetting of a solid electrolyte by a molten electrolyte, or prevent "ripening" of the positive electrode micro-domains, to name several utilities. In one embodiment, the performance additive may be an alkali metal halide, and in still other embodiments the performance additive may be an alkali metal halide salt. In some embodiments, the performance additive may comprise one or more of a bromide salt, a fluoride salt, or an iodide salt of an alkali metal halide.

In accordance with one aspect of the present invention, an energy storage device is provided. The device generally includes (a) a first compartment including an alkali metal; (b) a second compartment including a positive electrode composition in accord herewith along with a molten electrolyte salt; and (c) a solid separator capable of transporting alkali metal ions between the first and the second compartments.

The device may include a housing having an interior surface defining a volume. A separator may be disposed in the volume. The separator may have a first surface that defines at least a portion of a first compartment, and a second surface that defines at least a portion of a second compartment. The first compartment is in ionic communication with the second compartment through the separator. As used herein, the phrase "ionic communication" refers to the transport of ions between the first compartment and the second compartment, through the separator.

Figure 1:
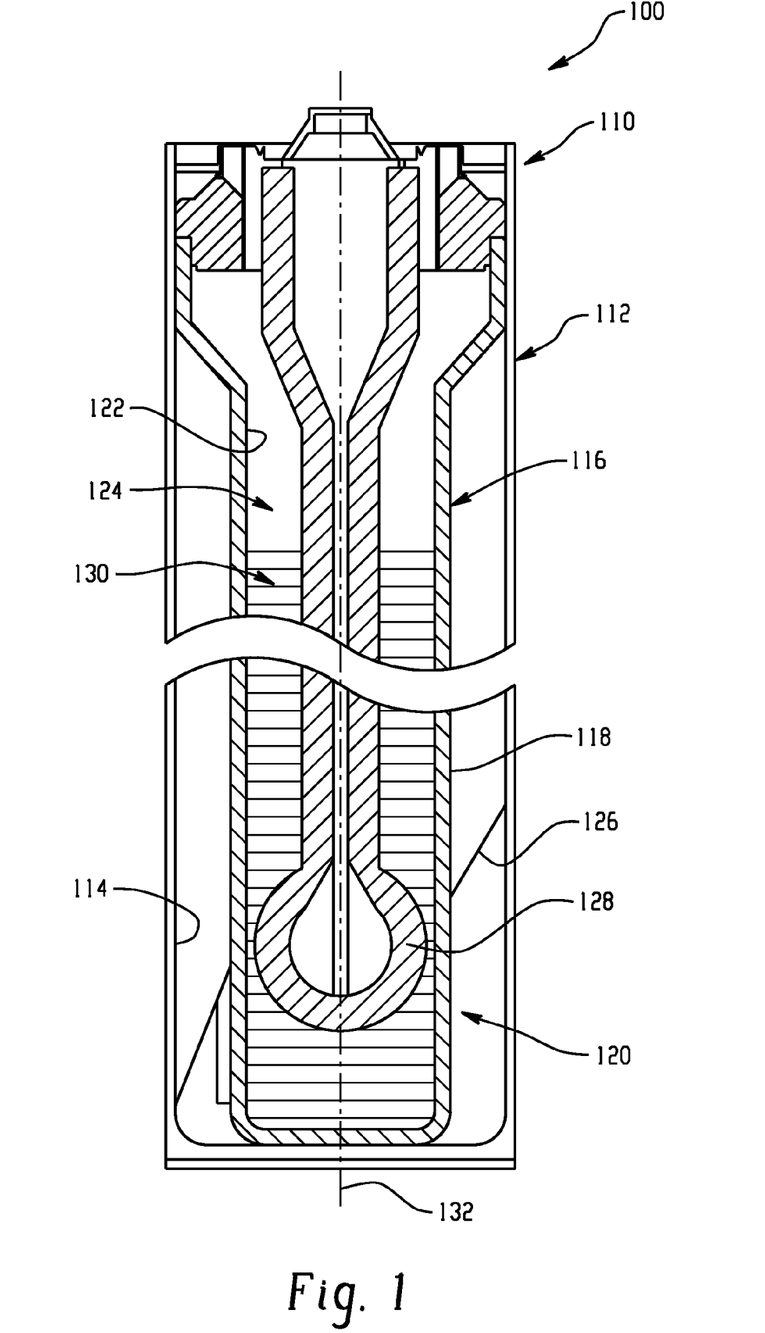
FIG. 1 is a schematic view illustrating a front cross-sectional view of an electrochemical cell in accordance with an embodiment of the invention.

Referring to FIG. 1 an electrochemical cell 100 is provided. More particularly a front cross-sectional view 110 of the electrochemical cell 100 is provided. The electrochemical cell 100 includes a housing 112. The housing 112 has an interior surface 114 defining a volume. A separator 116 is disposed inside the housing 112. The separator 116 has a first surface 118 that defines a first compartment 120, i.e., an anode compartment. The separator has a second surface 122 that defines a positive electrode compartment 124. An anode current collector 126 is connected to the anode compartment 120. A positive electrode current collector 128 is connected to the positive electrode compartment 124. A positive electrode composition 130, in accord herewith, is disposed inside the positive electrode compartment 124. The positive electrode composition 130 includes at least one electroactive metal, an alkali metal halide, an amount of aluminum, and optionally an amount of sodium iodide. Also disposed in the positive electrode compartment is an amount of molten electrolyte salt. The working temperature of the electrochemical cell 100, when it is a sodium-nickel chloride cell, is about 300 degrees Celsius.

The housing can be sized and shaped in accord with known battery or energy storage device standards and requirements suitable for applications including but not limited to hybrid electric vehicle, hybrid telecom, and UPS applications.

Typically, and with reference to FIG. 1, as assembled the anode compartment 120 of the electrochemical cell 100 is empty and is then filled during operation of the cell with metal from reduced metal ions that move from the positive electrode compartment 124 to the anode compartment 120 through the separator 116. The anodic material, for example, sodium, is molten during use. In some embodiments, the anode compartment may receive and store a reservoir of anodic material.

Additives suitable for use in the anodic material may include an oxygen scavenger. Suitable oxygen scavengers may include one or more of manganese, vanadium, zirconium, aluminum, or titanium. Other useful additives may include materials that increase capability of the molten anodic material to wet the separator surface 118 to ensure substantially uniform current flow throughout the separator.

The separator is usually an alkali metal ion conductor solid electrolyte that conducts alkali metal ions during use between the anode compartment and the cathode compartment. Suitable materials for the separators may include: beta-alumina material, for example beta-alumina, beta"-alumina, or a combination thereof; beta-gallate material, for example beta-gallate or beta"-gallate, or a combination thereof; gamma alumina; a micromolecular sieve, for example, a tectosilicate, such as a felspar, or a felspethoid; or a zeolite, for example a synthetic zeolite such as zeolite 3 A, 4 A, 13X, or ZSM-5. Other exemplary separator materials are rare-earth silicophosphates; silicon nitride; or other types of silicophosphates (e.g., NASICON: $Na_3Zr_2Si_2PO_{12}$). In one embodiment, the separator comprises a beta-alumina material. In that instance where the separator is a beta-alumina material, it may be stabilized by the addition of small amounts of a dopant, for example one or more oxides selected from lithia or magnesia, or like materials. These stabilizers may be used alone or in combination, or with other materials.

As known in the relevant art, the separator is disposed within the volume of the housing 112. The separator may have a cross-sectional profile normal to a vertical axis 132 of the housing 112, for example, a circle, a triangle, a square, a cross, or a star. Alternatively, the cross-sectional profile of the separator can be planar about the vertical axis 132. A planar configuration (or one with a slight dome) may be useful in a prismatic or button-type battery configuration, where the separator is domed or dimpled. Similarly, the separator can be flat or undulated. In one embodiment, the solid separator may include a shape that may be flat, undulated, domed or dimpled, or that comprises a shape with a cross-sectional profile that may be an ellipse, triangle, cross, star, circle, cloverleaf, rectangular, square, or multi-lobal.

In one embodiment the separator can be a tubular container, having at least one wall. The thickness of the wall will influence the ionic conductivity and the resistance across the wall.

Optionally, one or more electrically conductive sheets can be disposed within the volume of the housing. The electrically conductive sheets support the separator within the housing, and can protect the separator from vibrations caused by motion of the cell during use, and thus reduce or eliminate movement of the separator, relative to the housing.

In still other embodiments, the energy storage device may include a plurality of current collectors, including anode current collectors and positive electrode current collectors. The anode current collector is in electrical communication with the anode chamber, and the positive electrode current collector is in electrical communication with the contents of the positive electrode chamber. Suitable materials for the anode current collector may include steel, tungsten, titanium, nickel, copper, molybdenum, and combinations of two or more of the foregoing metals. The positive electrode current collector may be plated or clad.

The cathode compartment of the energy storage device includes the positive electrode composition of the present invention, as well as an molten electrolyte salt. As noted above, the positive electrode composition comprises: at least one electroactive metal; an alkali metal halide; and aluminum. In some embodiments, the positive electrode composition may further include one or more metal halide additives as noted above. The electroactive metal may be at least one metal selected from the group consisting of titanium, vanadium, niobium, molybdenum, nickel, cobalt, iron, chromium, manganese, silver, antimony, cadmium, tin, lead, copper, and zinc.

In one specific embodiment, the alkali metal forming the alkali metal halide may be sodium, and the separator may be a beta-alumina material. In another embodiment, the alkali metal of the alkali metal halide may be potassium or lithium, with the separator then being selected to be compatible therewith.

In accordance with another aspect of the present invention, a method for the preparation of the energy storage device is provided. The method comprises providing a housing having an interior surface defining a volume; and disposing a separator inside the housing. As noted, the separator has a first surface that defines at least a portion of a first compartment, and a second surface that defines at least a portion of a second compartment. The first compartment is in ionic communication with the second compartment through the separator. The method also includes the step of disposing a positive electrode composition in accord herewith, along with a molten electrolyte salt, in the cathode compartment. Some embodiments of this method may comprise operating the battery through a plurality of battery charge/discharge cycles to activate or condition the positive electrode composition material. As supported by the figures and data provided herein, use of the positive electrode composition in accord herewith may increase charge acceptance, enhance high power operation or operation for an extended period at a specified power, and improve cycle life.

A plurality of the electrochemical cells can be organized into an energy storage system. Multiple cells can be connected in series or parallel, or in a combination of series and parallel. For convenience, a group of coupled cells may be referred to as a module or pack. The ratings for the power and energy of the module may depend on such factors as the number of cells in the module. Other factors may be based on specific criteria for end-use applications. In one embodiment, the energy storage device more readily accepts charge, thus reducing recharge time over a plurality of charge-discharge cycles. In another embodiment, the energy storage device delivers increased watt hours, or exhibits an increase in discharge time, to a specific voltage.

Energy storage devices in accord herewith may be included in energy systems that further include, for example, a controller to operate specific cells within the system in accord with a specific operating protocol, a heat management device, additional energy storage devices that differ from those in accord herewith, and the like, all of which will be known and understood by those skilled in the relevant field of technology.

EXAMPLES

The following examples illustrate methods and embodiments in accord with the invention, and as such should not be construed as imposing limitations upon the claims. Unless specified otherwise, all of the components are commercially available from common chemical suppliers known to those skilled in the art, for example, Vale Europe Limited Clydach Swansea (nickel powder), Custom Powders Limited, UK (sodium chloride), Alfa Aesar, (aluminum powder), Sigma Aldrich (sodium halides), and Cerac (metal salts). Particle sizes, purity, and surface area will be parameters known to those skilled in the relevant art and as such are not necessarily limiting features of the invention.

The positive electrode composition used in the following examples was prepared in accord with known procedures for doing so, for example in accord with U.S. Pat. No. 5,536,594. As such, the materials were combined in a manner consistent with that disclosure and teaching except where otherwise specified. All positive electrode composition materials in the following examples were prepared by blending, pressing and grinding the powders to obtain granulated material that was used to assemble the cells tested.

Sodium chloride and aluminum chloride were mixed and melted together to produce sodium tetrachloroaluminate (NaAlCl4), the molten electrolyte salt used in these exemplary cells, in accord with known techniques for doing so.

Positive electrode compositions and molten electrolyte salt materials in accord herewith and prepared as noted above and in keeping with the cited disclosure were used to construct energy storage devices, for example in accord with the device shown in FIG. 1, which were then evaluated as set forth below. The positive electrode composition granules prepared using the procedure mentioned above were placed in a beta"-alumina tube, followed by densification by vibration, and then by the addition of the molten sodium tetrachloroaluminate, $NaAlCl_4$. For the following examples, all cells were nickel-sodium chloride cells, including aluminum in the amounts noted, and therefore included nickel metal or a combination of nickel and iron, sodium chloride, aluminum powder, one or more metal halide additives, and in some compositions a metal sulfide compound selected from zinc or iron sulfide, as noted. It is understood that alternative materials disclosed herein but not used in the example cells would be expected to provide substantially similar benefits.

For the following Examples 1 and 2, cells were constructed as noted above and cell testing was performed using a 50 A, 10V, multi-channel battery testing system. All cells were assembled in the discharged state. In practice, the cells can also be assembled in the charged or partially-charged state. Generally, a maiden charge was conducted at 325° C. and started at low current to avoid excessive current densities during the initial production of sodium in the negative electrode followed by cycling at a nominal temperature of 295° C.

Example 1

In this Example, three types of cells were constructed in accord with the foregoing procedure such that the positive electrode for each type of cell included a positive electrode composition of Ni, NaCl, NaF, Al, Fe, NaI, and FeS, disposed in the positive electrode compartment along with $NaAlCl_4$ molten electrolyte salt, wherein the components of the positive electrode in each cell type were substantially similar, except that the amount of Al was altered as noted in Table 1 below. Several cells of each type were constructed. The cells were charged and the aluminum oxidized. Also shown in Table 1 is the weight of the positive electrode composition and molten electrolyte salt of each cell pre- and post-oxidation.

TABLE 1

|  | CELL TYPE 1 | CELL TYPE 2 | CELL TYPE 3 |
| --- | --- | --- | --- |
| Positive Electrode Composition (g) Pre-Oxidation | 286.00 | 270.52 | 286.47 |
| Wt. % Al | 0.45 | 0.52 | 1.60 |
| Molten Electrolyte Salt (g) Pre-Oxidation | 123.50 | 124.40 | 120.40 |
| Positive Electrode Composition (g) Post-Oxidation | 273.24 | 256.90 | 242.90 |
| Molten Electrolyte Salt (g) Post-Oxidation | 132.88 | 134.42 | 153.38 |
| Positive Electrode Composition (g)/ Molten Electrolyte Salt (g) Post-Oxidation | 2.06 | 1.91 | 1.59 |

Figure 2:
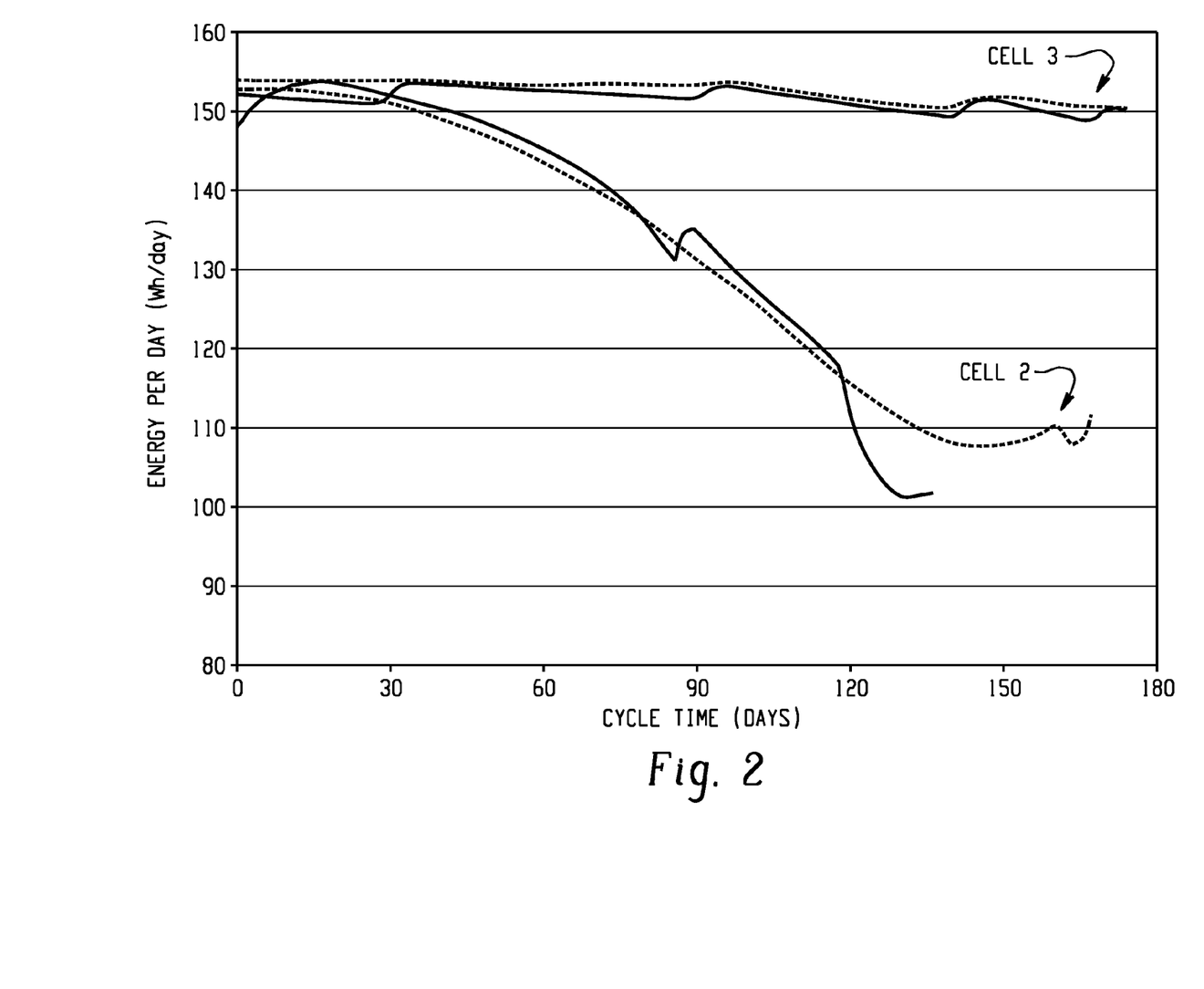
FIG. 2 is a graphical representation of comparative cell performance in top-of-charge operation for electrochemical cells, some of which include the positive electrode composition in accordance with the embodiments described herein.

It is seen from the foregoing that as the amount of aluminum (weight percent based on the weight of the positive electrode composition) was increased from about 0.5 in Cell Types 1 and 2 to about 1.6 in Cell Type 3, the amount of positive electrode/molten electrolyte salt was reduced. With reference to FIG. 2, based on the compositions provided above, it is further seen that in top-of-charge operation of the cells the cell having the higher amount of aluminum (Cell Type 3) exhibited reduced degradation, corresponding to the flatter line near the top of the graph, as compared to those cells with lower amounts of aluminum in the positive electrode composition (Cell Type 1). The high aluminum cells exhibited improved cycle life, which correlates to more consistent charge acceptance.

Example 2

Figure 3:
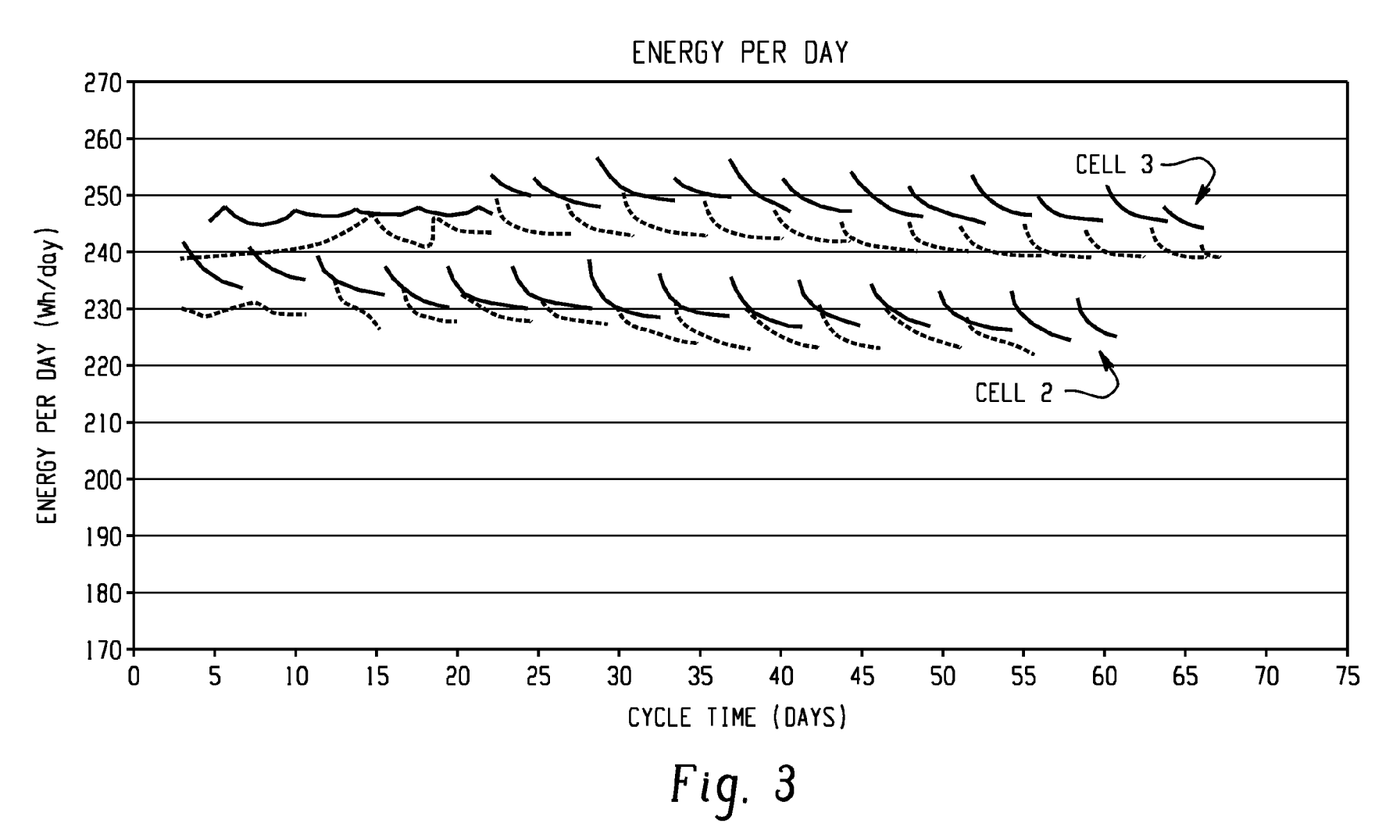
FIG. 3 is a graphical representation of comparative cell performance in partial-state-of-charge operation for electrochemical cells, some of which include the positive electrode composition in accordance with the embodiments described herein

Cells having Cell Type 2 and Cell Type 3 positive electrode compositions were used to evaluate cell performance in partial-state-of-charge operation. FIG. 3 provides a graph of data collected from cells with positive electrode compositions 2 and 3. As seen, cells having the higher aluminum content positive electrode composition (Cell Type 3) exhibited improved performance as compared to the cells including the positive electrode composition having the lower aluminum content (Cell Type 2).

Example 3

Figure 4:
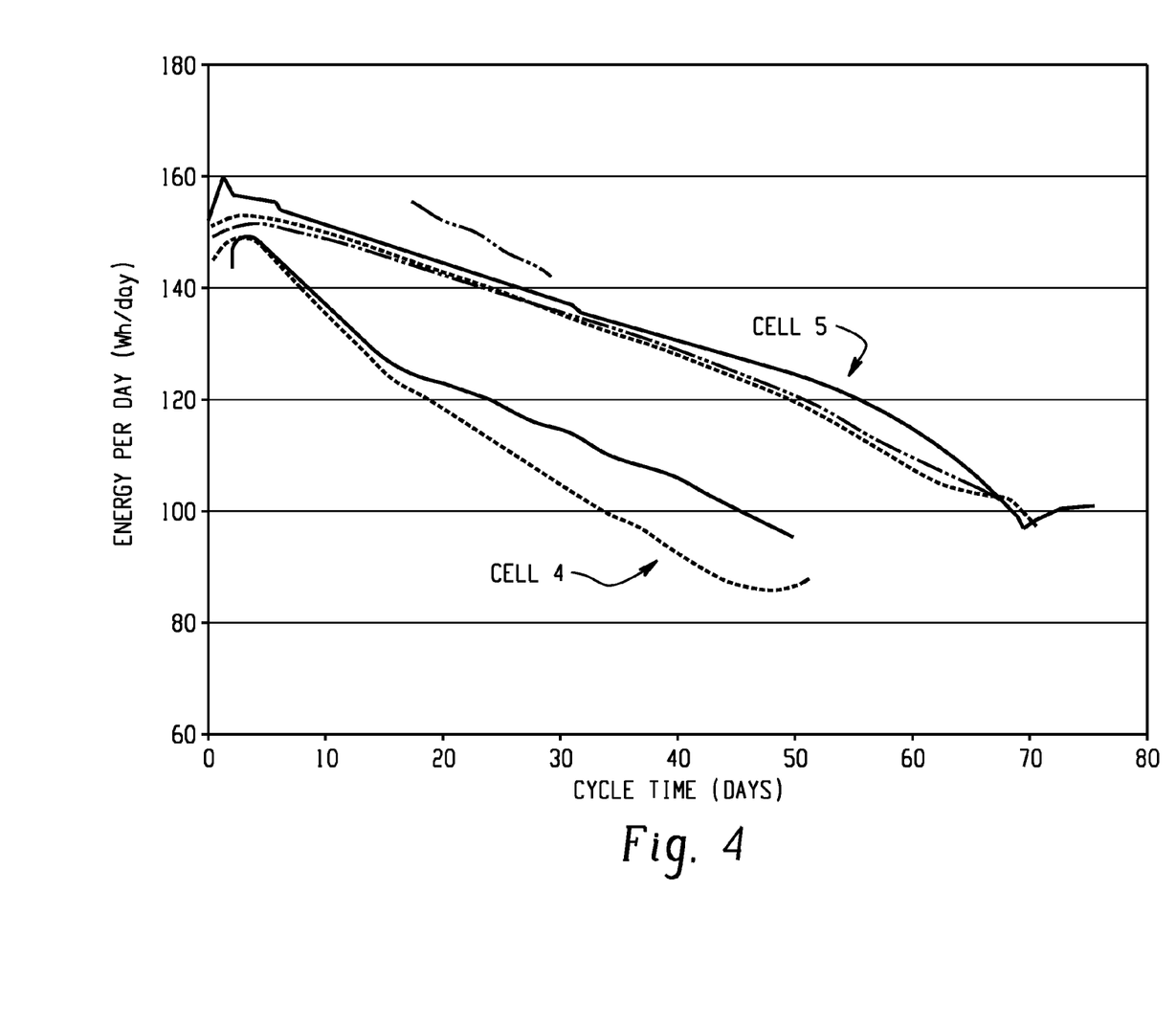
FIG. 4 is a graphical representation of comparative cell performance in top-of-charge operation for electrochemical cells, some of which include the positive electrode composition in accordance with the embodiments described herein.

In this Example, cells were constructed using positive electrode compositions that included the same amounts of: electroactive metal, in this case Ni; alkali metal halide, in this instance sodium chloride; and alkali metal halide additives, in this case NaF and NaI. Each cell also included the same amount of molten electrolyte salt, which was $NaAlCl_4$. The Cell Type 4 positive electrode composition included 0.58 weight percent Al based on the weight of the positive electrode composition, and further included elemental iron as an additional electroactive metal. The Cell Type 5 positive electrode composition, however, included no iron, and 2.00 weight percent Al based on the weight of the positive electrode composition. Cell Type 4 and Cell Type 5 further differ from the cells used to conduct the testing for Examples 1 and 2 in that they do not contain any sulfur. Several cells of each type were constructed and tested. FIG. 4 provides a graph showing top-of-charge operation data for all of the Cell Type 4 composition and Cell Type 5 composition testing. In this graph, those cells including the higher aluminum content Cell Type 5 positive electrode composition exhibited a reduction in cell charge degradation over cycle life as compared to the performance of those cells having the Cell Type 4 positive electrode composition.

Example 4

In accord with the foregoing cell construction and testing procedures, exemplary cell compositions were prepared and tested. Each cell composition was tested as a series chain of 10 similar cells. This example compares the charge and discharge performance of three positive electrode compositions, wherein all have substantially the same composition, with only the amount of aluminum and sodium chloride being varied. As is shown in Table 2, the charge capacity (Ah) remains the same, while the amount of energy (Wh) delivered to a set voltage increases with an increase in the amount of aluminum included in the positive electrode composition.

TABLE 2

POSITIVE ELECTRODE COMPOSITIONS IN CELL TYPES 6-8

| Positive Electrode Composition | CELL TYPE 6 Grams | Wt. % | CELL TYPE 7 Grams | Wt. % | CELL TYPE 8 Grams | Wt. % |
| --- | --- | --- | --- | --- | --- | --- |
| Ni | 155.50 | 61.50 | 155.50 | 59.67 | 155.50 | 57.95 |
| NaCl | 85.11 | 33.66 | 92.04 | 35.32 | 98.97 | 36.88 |
| NaF | 4.13 | 1.63 | 4.13 | 1.58 | 4.13 | 1.54 |
| Al | 1.10 | 0.43 | 1.90 | 0.73 | 2.70 | 1.01 |
| NaI | 0.42 | 0.17 | 0.42 | 0.16 | 0.42 | 0.16 |
| ZnS | 6.61 | 2.61 | 6.61 | 2.54 | 6.61 | 2.46 |
| $NaAlCl_4$ added | 126 | | 126 | | 126 | |
| $NaAlCl_4$ generated | 7.82 | | 13.5 | | 19.9 | |
| Total $NaAlCl_4$ | 133.82 | | 139.5 | | 145.19 | |
| Charge Ah[1] | 35 Ah | | 35 Ah | | 35 Ah | |
| Wh[2] | 662 | | 716 | | 730 | |

Figure 5:
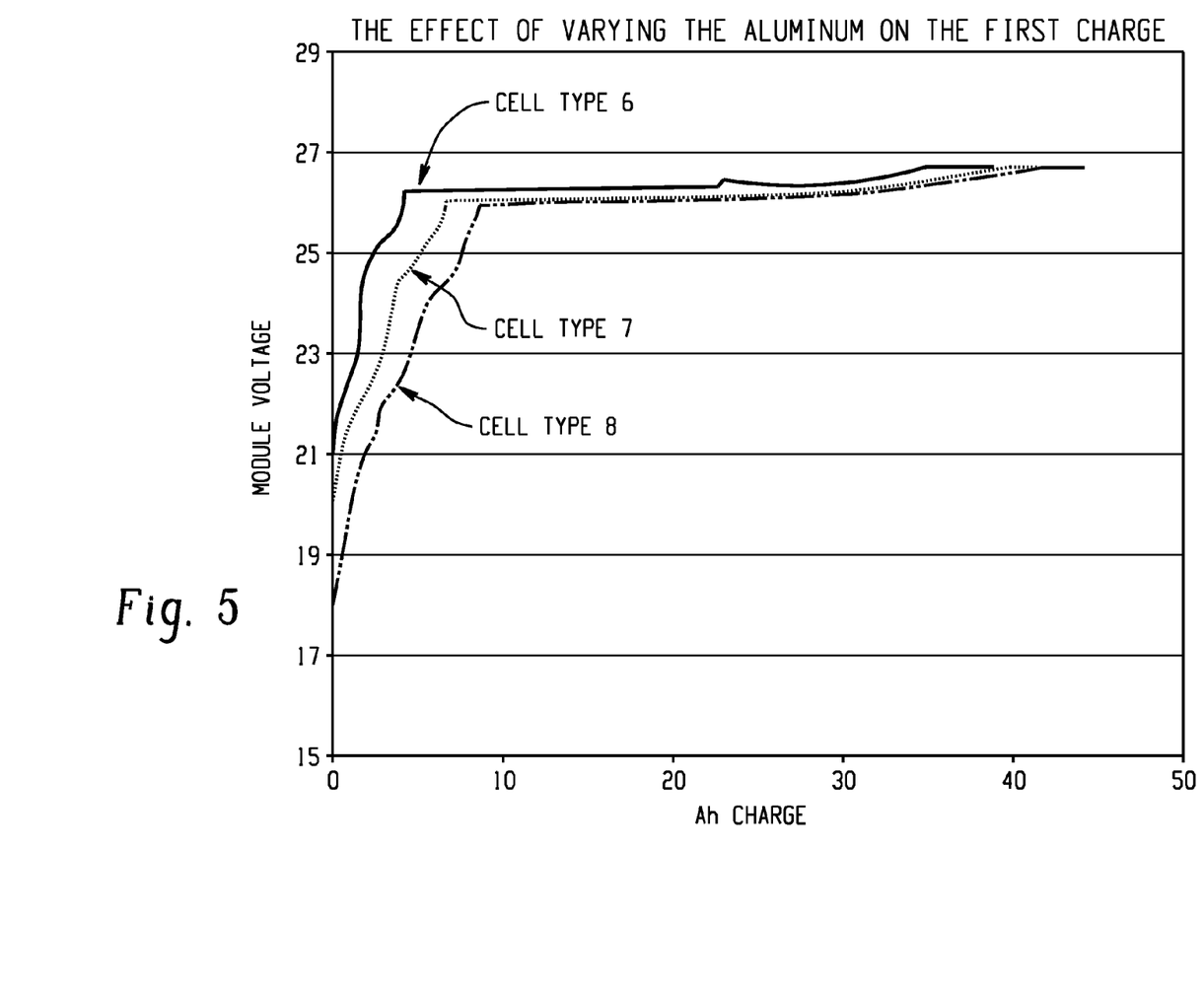
FIG. 5 is a graphical representation of the effect on first charge of varying the amount of aluminum of an electrochemical cell including a positive electrode composition in accordance with the embodiments described herein.

[1]First charge nickel + sodium chloride → nickel chloride (see FIG. 5)
[2]Delivered on discharge 2 from 10 cell module In FIG. 5, it is clear that the aluminum oxidation reaction (below 23V for the 10 cell modules) increases as a function of the increasing amount of aluminum, in accord with the compositions set forth in Table 2. However, the main reaction above 26V is the same for each module and the capacity is 35 Ah for each module, regardless of the additional aluminum content.

Figure 6A:
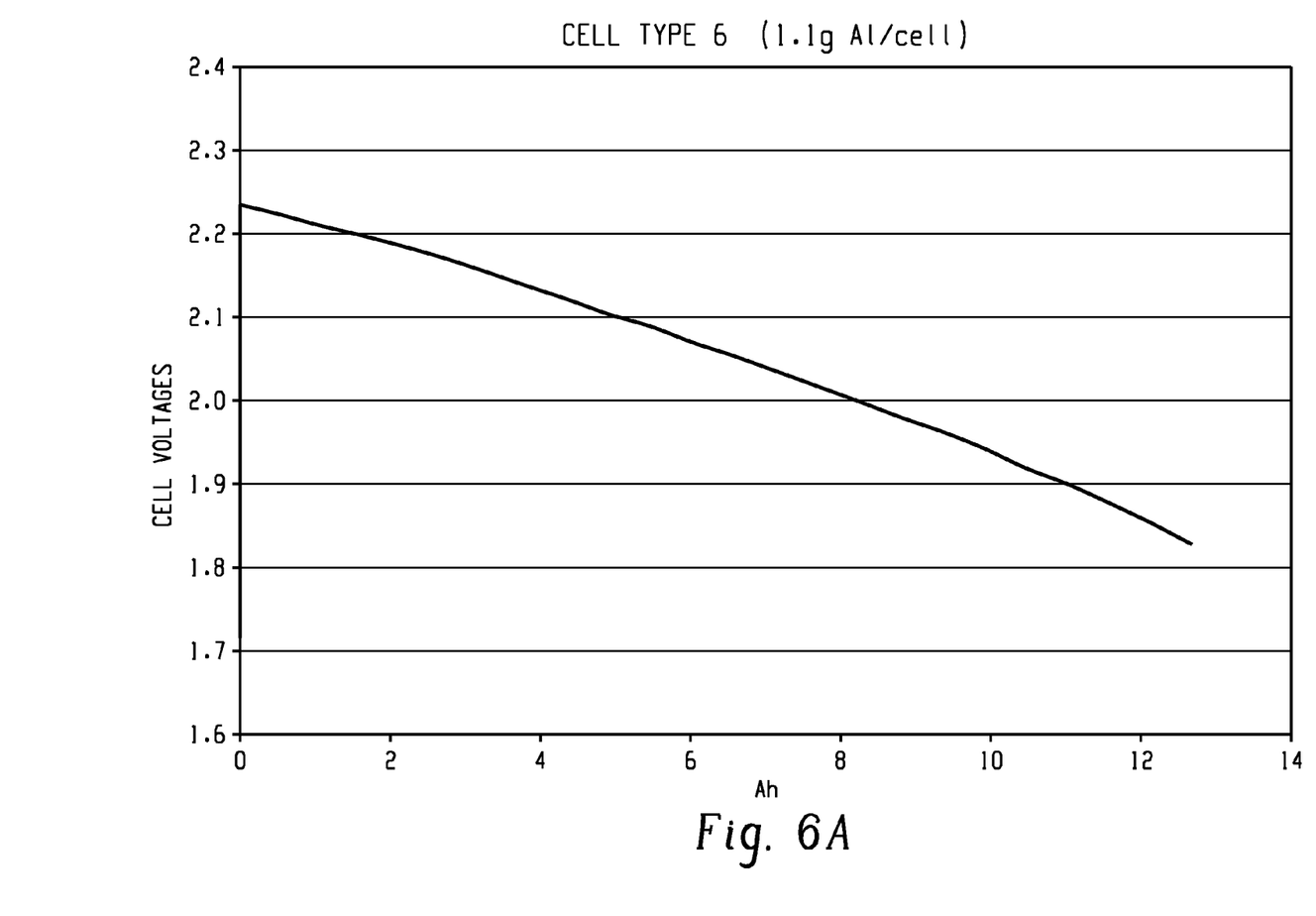
FIGS. 6A-C are graphical representations of the increase in Wh delivered to a set power for electrochemical cells including increasing amounts of Al in a positive electrode composition in accordance with the embodiments described herein.
Figure 6B:
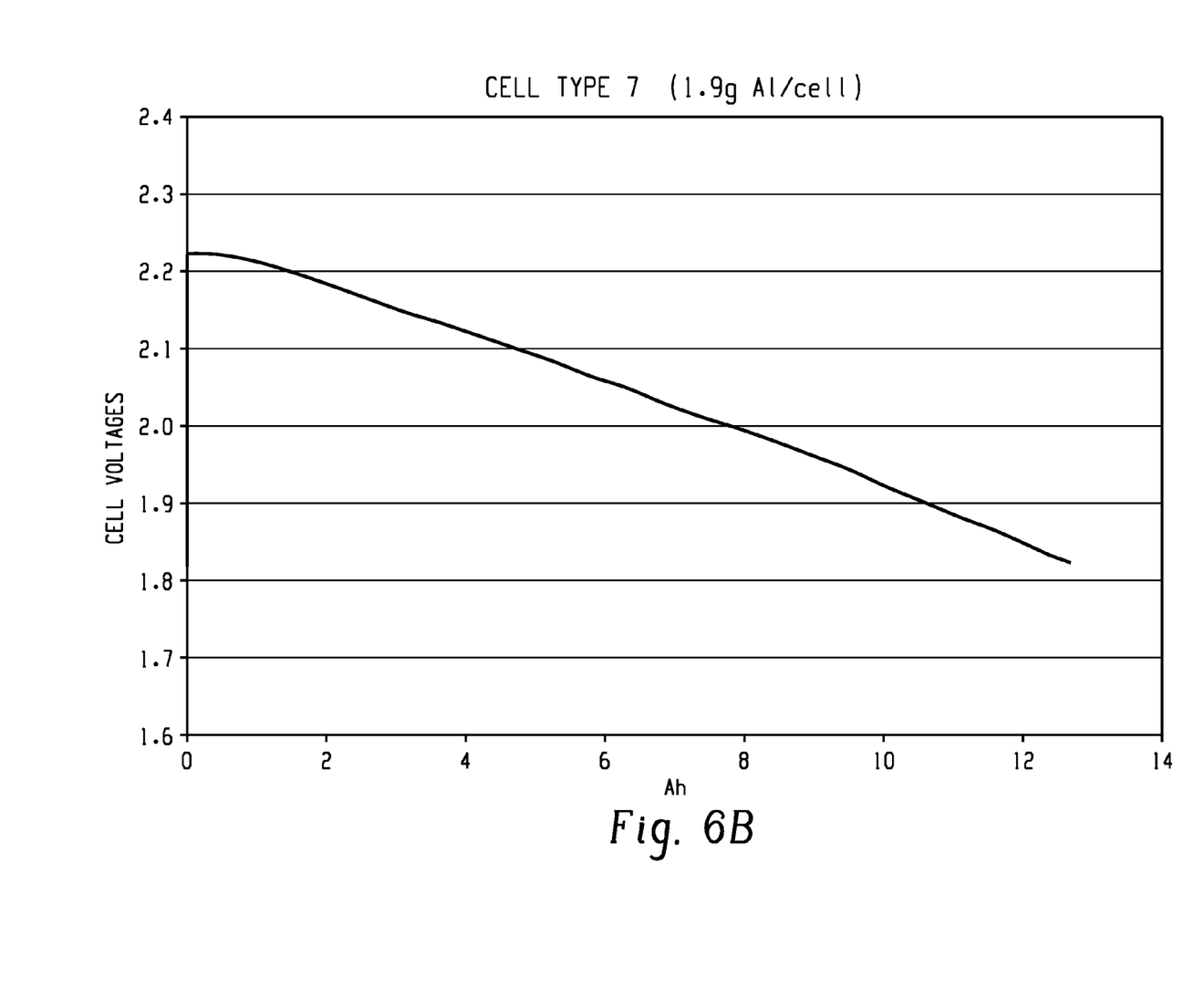
Figure 6C:
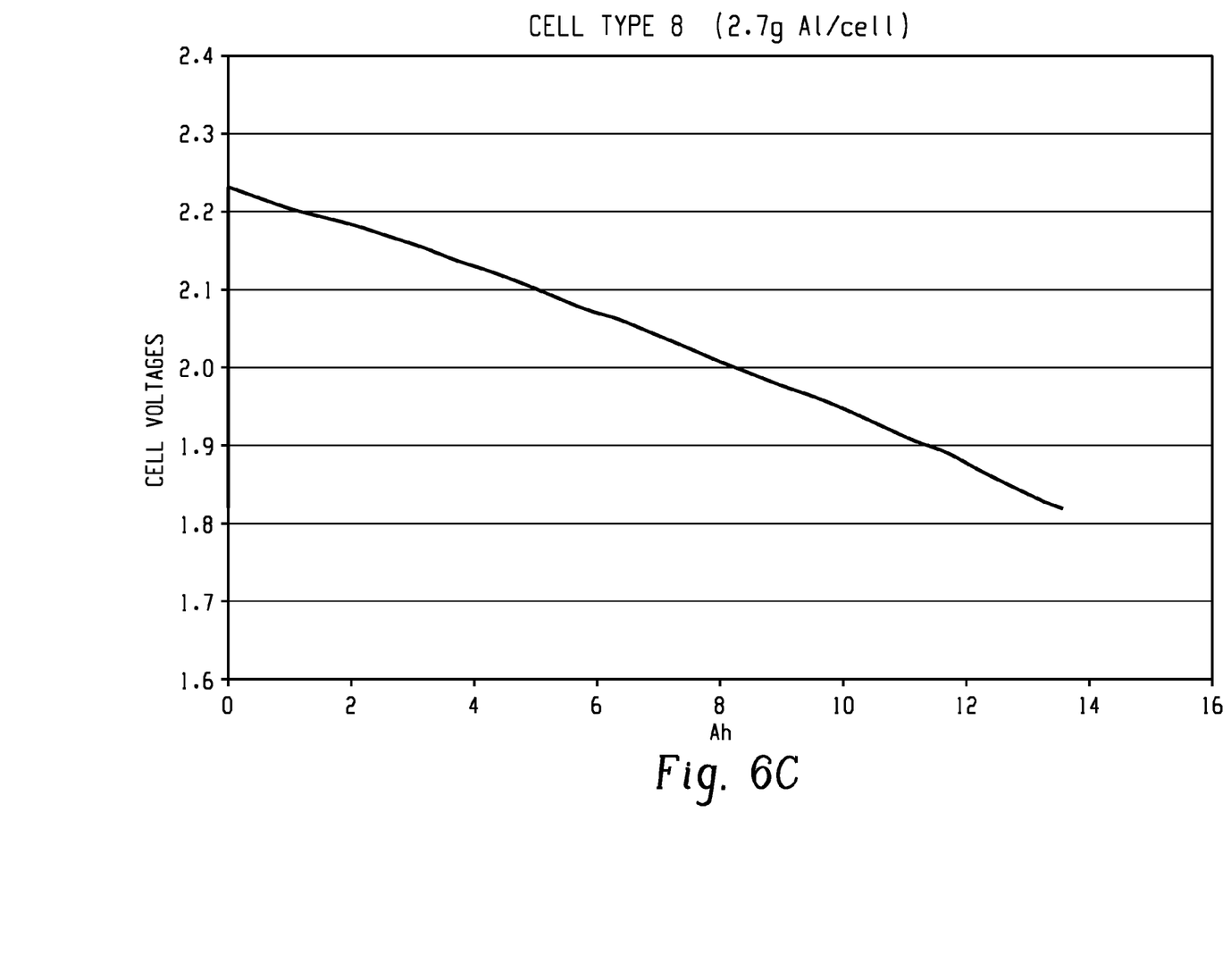
Figure 7:
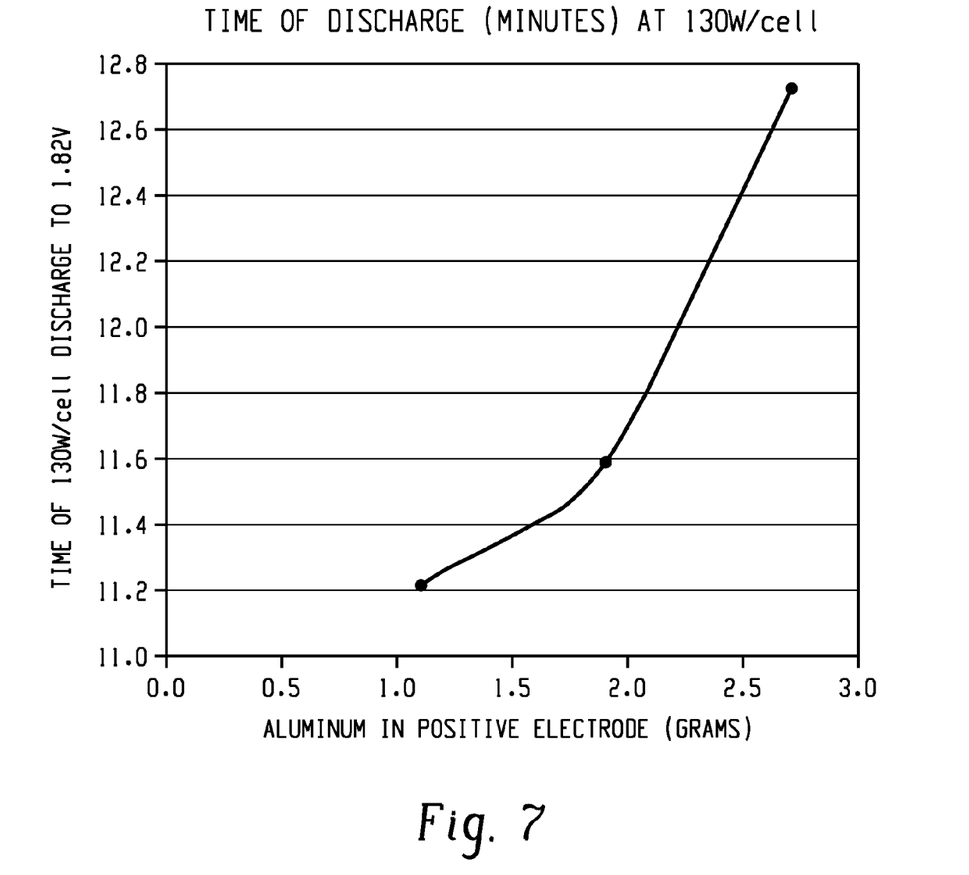
FIG. 7 is a graphical representation of the time of discharge to a set power based on the amount of aluminum included in a positive electrode composition in accordance with the embodiments described herein of an electrochemical cell.

FIGS. 6A-C show the thirteenth discharge, which is a high rate constant power discharge performed on each of the 10 cell modules, Cell Type 6, Cell Type 7, and Cell Type 8, at 1300 W constant power (130 W/cell) to a 18.2V discharge voltage cut off. Thus, in one embodiment in accord with these examples, at least one benefit of including an additional amount of aluminum is clearly seen as the increased capacity the module can deliver at 1300 W discharge (to 18.2V). This advantage is shown graphically in FIG. 7 as an increased amount of time the module can sustain 1300 W with higher levels of aluminum.

The foregoing examples are illustrative of some features of the invention. The appended claims are intended to claim the invention as broadly as has been conceived; and the examples herein presented are illustrative of selected embodiments from a manifold of all possible embodiments. Accordingly, it is Applicants' intention that the appended claims not be limited to the illustrated features of the invention by the choice of examples utilized. Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have a utility distinct from the utility of the reaction product or final material. Other subsequent changes, transformations, or reactions may result from bringing the specified reactants and/or components together under the conditions called for pursuant to this disclosure. In these other subsequent changes, transformations, or reactions, the reactants, ingredients, or the components to be brought together may identify or indicate the reaction product.

All ranges disclosed herein are inclusive of the endpoints, and the endpoints are combinable with each other. The terms "first," "second," and the like, as used herein, do not denote any order, quantity, or importance, but rather are used to distinguish one element from another. While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention should not be limited by the foregoing description, but is only limited by the scope of the appended claims.

The invention claimed is:

1. A positive electrode composition comprising:
   at least one electroactive metal;
   at least one alkali metal halide; and
   aluminum present in an amount of at least about 1.0 weight percent, based on the weight of the positive electrode composition.

2. The positive electrode composition according to claim 1, wherein the at least one electroactive metal comprises nickel.

3. The positive electrode composition according to claim 1, wherein the alkali metal halide includes an alkali metal selected from the group of sodium, potassium, and lithium, and a halide selected from the group of chloride, bromide, and fluoride.

4. The positive electrode composition according to claim 1, wherein the positive electrode composition further includes elemental sulfur, and/or one or more sulfides.

5. The positive electrode composition according to claim 1, wherein the aluminum is in the form of elemental aluminum.

6. The positive electrode composition according to claim 1, wherein the composition is included in an energy storage device.

7. The positive electrode composition according to claim 1, wherein the composition comprises:
   about 50-65 wt % of the electroactive metal, based on the weight of the positive electrode composition;
   about 35-45 wt % of the alkali metal halide based on the total weight of the positive electrode composition;
   at least about 1.0 wt % of the aluminum, based on the weight of the positive electrode composition; and
   about 0-1 wt % sodium iodide, based on the weight of alkali metal halide in the positive electrode composition.

8. The positive electrode composition according to claim 7, wherein:
   the at least one electroactive active metal is selected from the group consisting of titanium, vanadium, niobium, molybdenum, nickel, iron, cobalt, chromium, manganese, silver, antimony, cadmium, tin, lead, copper, and zinc;
   the at least one alkali metal halide is selected from the group consisting of sodium chloride, sodium iodide, sodium bromide, sodium fluoride, potassium chloride, potassium iodide, potassium bromide, potassium fluoride, lithium chloride, lithium iodide, lithium bromide, lithium fluoride, cesium chloride, and combination thereof; and
   wherein the positive electrode composition further includes about 0.1-10 wt % of elemental sulfur, one or more sulfides, or a combination thereof.

9. A positive electrode composition comprising:
   at least one electroactive metal;
   at least one alkali metal halide other than sodium iodide;
   aluminum present in an amount of at least 0.5 weight percent, based on the weight of the positive electrode composition; and
   sodium iodide present in an amount up to about 1.0 weight percent of the halide content, based on the weight of alkali metal halide in the positive electrode composition.

10. The positive electrode composition according to claim 9, wherein the at least one electroactive metal is selected from the group consisting of nickel, iron, a nickel or iron compound, and combinations thereof.

11. The positive electrode composition according to claim 9, wherein the alkali metal halide includes an alkali metal selected from the group of sodium, potassium, and lithium, and a halide selected from the group of chloride, bromide, and fluoride.

12. The positive electrode composition according to claim 9, wherein the positive electrode composition further includes elemental sulfur and/or one or more sulfides.

13. The positive electrode composition according to claim 9, wherein the aluminum is in the form of elemental aluminum.

14. The positive electrode composition according to claim 9, wherein the composition further includes one or more additives selected to provide at least one or more of the following properties: increase of ionic conductivity; increase or decrease of solubility of charged cathodic species; improve wetting of a solid electrolyte by a molten electrolyte; and preventing ripening of positive electrode micro-domains.

15. A positive electrode comprising:
   a housing;
   a current collector;
   a positive electrode composition disposed within the housing, the composition comprising:
      at least one electroactive metal;
      an alkali metal halide; and
      aluminum present in an amount of at least 1.0 weight percent, based on the weight of the positive electrode composition; and
   a molten electrolyte salt disposed within the housing.

16. The positive electrode according to claim 15, wherein the electroactive metal of the positive electrode composition includes nickel and the molten electrolyte salt is sodium tetrachloroaluminate.

17. The positive electrode according to claim 15, wherein the positive electrode is part of an energy storage device that is rechargeable over a plurality of cycles.

* * * * *